United States Patent
Kang et al.

(10) Patent No.: US 11,416,042 B2
(45) Date of Patent: Aug. 16, 2022

(54) FLEXIBLE DISPLAY APPARATUS AND METHOD OF PROVIDING USER INTERFACE BY USING THE SAME

(71) Applicant: SAMSUNG ELECTRONICS CO., LTD., Suwon-si (KR)

(72) Inventors: Kyung-a Kang, Seoul (KR); Ji-yeon Kwak, Seoul (KR); Hyun-jin Kim, Seoul (KR); Joon-Kyu Seo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/086,077

(22) Filed: Oct. 30, 2020

(65) Prior Publication Data

US 2021/0048854 A1 Feb. 18, 2021

Related U.S. Application Data

(63) Continuation of application No. 13/611,906, filed on Sep. 12, 2012, now abandoned.

(30) Foreign Application Priority Data

Nov. 22, 2011 (KR) .................. 10-2011-0122398

(51) Int. Cl.
*G06F 1/16* (2006.01)
*G06F 3/0481* (2022.01)
(Continued)

(52) U.S. Cl.
CPC .......... *G06F 1/1694* (2013.01); *G06F 1/1652* (2013.01); *G06F 1/3265* (2013.01);
(Continued)

(58) Field of Classification Search
CPC .. G06F 1/1694; G06F 3/0484; G06F 3/04817; G06F 3/0487; G06F 1/1652; G06F 3/0481; G06F 3/017
See application file for complete search history.

(56) References Cited

U.S. PATENT DOCUMENTS

| 7,990,513 B2 | 8/2011 | Belyaev |
| 8,174,628 B2 | 5/2012 | Matsushita et al. |

(Continued)

FOREIGN PATENT DOCUMENTS

| CN | 101171621 | 4/2008 |
| CN | 101674361 | 3/2010 |

(Continued)

OTHER PUBLICATIONS

Khalilbeigi, M., Lissermann, R., Mulhauser, M., & Steimle, J. (May 2011). Xpaaand: interaction techniques for rollable displays. In Proceedigns of the SIGCHI Conference on Human Factors in Computing Systems (pp. 2729-2732). ACM.

(Continued)

*Primary Examiner* — Justin R. Blaufeld
(74) *Attorney, Agent, or Firm* — Sughrue Mion, PLLC (57) ABSTRACT

A flexible display apparatus and a method of displaying a User Interface (UI) are provided. The flexible display apparatus includes an exposed area determining unit for determining an exposed screen area facing outwards with respect to the flexible display apparatus; a User Interface (UI) generating unit for generating a UI corresponding to the outwardly facing exposed screen area; and a display unit for displaying the generated UI on the outwardly facing exposed screen area.

10 Claims, 11 Drawing Sheets

(51) Int. Cl.

| | | |
|---|---|---|
| G06F 3/01 | (2006.01) | |
| G06F 3/0487 | (2013.01) | |
| G06F 3/04817 | (2022.01) | |
| G06F 3/0484 | (2022.01) | |
| G06F 1/3234 | (2019.01) | |
| G09G 5/14 | (2006.01) | |

(52) U.S. Cl.
CPC ............ *G06F 3/017* (2013.01); *G06F 3/0481* (2013.01); *G06F 3/0484* (2013.01); *G06F 3/0487* (2013.01); *G06F 3/04817* (2013.01); *G09G 5/14* (2013.01); *G09G 2354/00* (2013.01); *G09G 2380/02* (2013.01)

(56) References Cited

U.S. PATENT DOCUMENTS

| | | | |
|---|---|---|---|
| 8,543,166 B2 | 9/2013 | Choi et al. | |
| 8,666,455 B2* | 3/2014 | Song | H04M 1/0268 |
| | | | 455/566 |
| 8,773,411 B2 | 7/2014 | Van Lieshout et al. | |
| 8,890,911 B2 | 11/2014 | Moriwaki | |
| 8,928,437 B2* | 1/2015 | Lauder | H01F 7/04 |
| | | | 361/679.01 |
| 8,959,453 B1* | 2/2015 | Harnish | H04N 21/47217 |
| | | | 715/788 |
| 8,988,381 B1* | 3/2015 | Kim | G06F 3/04166 |
| | | | 345/157 |
| 9,013,432 B2* | 4/2015 | Kang | G06F 3/0487 |
| | | | 345/173 |
| 9,052,769 B2 | 6/2015 | Choi et al. | |
| 9,261,914 B2 | 2/2016 | Moriwaki | |
| 9,326,404 B1* | 4/2016 | Wood | G06F 1/1686 |
| 9,335,793 B2* | 5/2016 | Rothkopf | G06F 3/04883 |
| D819,020 S * | 5/2018 | Choi | D14/341 |
| 11,048,303 B2* | 6/2021 | Kwak | G06F 1/1647 |
| 2003/0025737 A1* | 2/2003 | Breinberg | G06F 8/38 |
| | | | 715/801 |
| 2004/0196210 A1* | 10/2004 | Nagatsuka | G06F 3/1423 |
| | | | 345/1.1 |
| 2005/0099361 A1* | 5/2005 | Majer | G06F 3/1423 |
| | | | 345/1.3 |
| 2005/0229110 A1* | 10/2005 | Gegner | G16H 40/63 |
| | | | 715/792 |
| 2006/0209218 A1 | 9/2006 | Lee et al. | |
| 2007/0085845 A1* | 4/2007 | Kikuchi | G06F 3/0412 |
| | | | 345/204 |
| 2007/0222935 A1 | 9/2007 | Belyaev | |
| 2008/0291225 A1* | 11/2008 | Arneson | G06F 3/147 |
| | | | 345/698 |
| 2008/0303782 A1* | 12/2008 | Grant | G06F 3/016 |
| | | | 345/173 |
| 2009/0051830 A1* | 2/2009 | Matsushita | G06F 1/1652 |
| | | | 361/679.05 |
| 2009/0159763 A1* | 6/2009 | Kim | A47B 23/044 |
| | | | 248/176.1 |
| 2009/0219247 A1* | 9/2009 | Watanabe | G06F 3/0485 |
| | | | 345/157 |
| 2010/0045705 A1* | 2/2010 | Vertegaal | G06F 1/1613 |
| | | | 345/173 |
| 2010/0053081 A1 | 3/2010 | Jee et al. | |
| 2010/0056223 A1* | 3/2010 | Choi | G06F 1/1652 |
| | | | 455/566 |
| 2010/0060548 A1* | 3/2010 | Choi | G06F 1/1652 |
| | | | 345/1.3 |
| 2010/0060664 A1* | 3/2010 | Kilpatrick, II | G06F 1/1654 |
| | | | 345/1.3 |
| 2010/0064244 A1* | 3/2010 | Kilpatrick, II | H04M 1/0243 |
| | | | 345/1.3 |
| 2010/0117975 A1* | 5/2010 | Cho | G06F 1/165 |
| | | | 345/173 |
| 2010/0120470 A1* | 5/2010 | Kim | G06F 3/04883 |
| | | | 715/830 |
| 2010/0141605 A1* | 6/2010 | Kang | G09F 9/301 |
| | | | 345/174 |
| 2010/0295761 A1 | 11/2010 | Van Lieshout et al. | |
| 2011/0043479 A1 | 2/2011 | van Aerle et al. | |
| 2011/0134144 A1 | 6/2011 | Moriwaki | |
| 2011/0134145 A1* | 6/2011 | Moriwaki | G06F 1/1652 |
| | | | 345/660 |
| 2011/0241973 A1 | 10/2011 | Manning | |
| 2011/0241998 A1* | 10/2011 | McKinney | H04M 1/0247 |
| | | | 345/204 |
| 2012/0038570 A1* | 2/2012 | Delaporte | G06F 1/1679 |
| | | | 345/173 |
| 2012/0194448 A1* | 8/2012 | Roth | G06F 1/1643 |
| | | | 361/679.01 |
| 2012/0291068 A1* | 11/2012 | Khushoo | H04L 12/282 |
| | | | 725/38 |
| 2013/0083496 A1* | 4/2013 | Franklin | H01M 50/463 |
| | | | 361/752 |
| 2013/0088410 A1* | 4/2013 | Hill | G06F 3/1431 |
| | | | 345/1.1 |
| 2013/0222323 A1* | 8/2013 | McKenzie | G06F 1/169 |
| | | | 345/173 |
| 2013/0298068 A1* | 11/2013 | Lee | G06F 3/04883 |
| | | | 715/776 |
| 2013/0321264 A1* | 12/2013 | Park | G06F 3/01 |
| | | | 345/156 |
| 2013/0328917 A1* | 12/2013 | Zambetti | G06F 1/1626 |
| | | | 345/620 |
| 2014/0028596 A1* | 1/2014 | Seo | G06F 3/0481 |
| | | | 345/173 |
| 2014/0085184 A1* | 3/2014 | Vertegaal | G06F 3/017 |
| | | | 345/156 |
| 2015/0022445 A1 | 1/2015 | Moriwaki | |
| 2017/0102738 A1* | 4/2017 | Park | G06F 1/1626 |
| 2020/0209923 A1* | 7/2020 | Ahn | G06F 3/04883 |

FOREIGN PATENT DOCUMENTS

| | | |
|---|---|---|
| CN | 101910966 | 12/2010 |
| CN | 102097048 | 6/2011 |
| EP | 1 970 866 | 9/2008 |
| JP | 9-128194 | 5/1997 |
| JP | 2002-278515 | 9/2002 |
| JP | 2005215320 | 8/2005 |
| JP | 2009-025719 | 2/2009 |
| JP | 2011-034087 | 2/2011 |
| JP | 2011-118244 | 6/2011 |
| JP | 2011-118245 | 6/2011 |
| KR | 1020080035709 | 4/2008 |
| KR | 1020100027501 | 3/2010 |
| RU | 2 318 230 | 2/2008 |
| RU | 105060 | 5/2011 |

OTHER PUBLICATIONS

Wikipedia, Model-view-controller, http://en.wikipedia.org/wiki/Model-view-controller (accessed Oct. 21, 2014).
European Search Report dated May 29, 2015 issued in counterpart application No. 12850819.9-1959, 6 pages.
Russian Office Action dated Jun. 16, 2015 issued in counterpart application No. 2014120544/08, 9 pages.
Japanese Office Action dated Aug. 3, 2015 issued in counterpart application No. 2014-542221, 8 pages.
Japanese Office Action dated Jan. 25, 2016 issued in counterpart application No. 2014-542221, 5 pages.
Russian Office Action dated Feb. 1, 2016 issued in counterpart application No. 2014120544/08, 13 pages.
Chinese Office Action dated Jun. 20, 2016 issued in counterpart application No. 201280057429.3, 25 pages.
Korean Office Action dated Aug. 5, 2016 issued in counterpart application No. 10-2011-0122398, 8 pages.
Australian Office Action dated Sep. 7, 2016 issued in counterpart application No. 2015252106, 3 pages.
Korean Office Action dated Feb. 3, 2017 issued in counterpart application No. 10-2011-0122398, 14 pages.

(56) References Cited

OTHER PUBLICATIONS

Chinese Office Action dated Mar. 14, 2017 issued in counterpart application No. 201280057429.3, 15 pages.
Australian Office Action dated Jan. 10, 2017 issued in counterpart application No. 2015252106, 3 pages.
Australian Office Action dated Mar. 22, 2017 issued in counterpart application No. 2015252106, 3 pages.
Australian Examination Report dated Jul. 19, 2017 issued in counterpart application No. 2015252106, 3 pages.
Chinese Office Action dated Aug. 17, 2017 issued in counterpart application No. 201280057429.3, 9 pages.
Australian Office Action dated Sep. 5, 2017 issued in counterpart application No. 2015252106, 3 pages.
European Search Report dated Dec. 11, 2017 issued in counterpart application No. 12850819.9-1879, 6 pages.
Korean Office Action dated Nov. 25, 2017 issued in counterpart application No. 10-2017-0109391, 8 pages.
Korean Office Action dated May 31, 2018 issued in counterpart application No. 10-2017-0109391, 7 pages.
European Search Report dated Oct. 15, 2018 issued in counterpart application No. 12 850 819.9-1221, 8 pages.
HGF Limited, Letter of the Applicant, Apr. 17, 2018, 7 pages.
Korean Office Action dated Dec. 24, 2018 issued in counterpart application No. 10-2017-0109391, 7 pages.
Korean Office Action dated Feb. 26, 2019 issued in counterpart application No. 10-2017-0109391, 6 pages.
Indian Examination Report dated Oct. 23, 2019 issued in counterpart application No. 939/MUMNP/2014, 6 pages.
Brazilian Search Report dated Nov. 19, 2019 issued in counterpart application No. BR112014011708-0, 7 pages.
Chinese Patent Office, Communication issued by the Chinese Patent Office on Jun. 18, 2020 in copending Application No. 201711057840.1.

\* cited by examiner

FLEXIBLE DISPLAY APPARATUS AND METHOD OF PROVIDING USER INTERFACE BY USING THE SAME

PRIORITY

This application is a Continuation of U.S. application Ser. No. 13/611,906, filed on Sep. 12, 2012, in the U.S. Patent and Trademark Office, which claims priority under 35 U.S.C. § 119(a) to Korean Patent Application No. 10-2011-0122398, filed on Nov. 22, 2011, in the Korean Intellectual Property Office, the entire disclosures of which are incorporated by reference herein in their entirety.

BACKGROUND OF THE INVENTION

1. Field of the Invention

The present invention relates generally to a flexible display apparatus and method displaying a User Interface (UI), and more particularly, to a method and apparatus for providing a UI that differs according to a state of a flexible display apparatus.

2. Description of the Related Art

Portable terminals have generally been developed to provide various functions, such as, a movie reproducing function, a Digital Multimedia Broadcasting (DMB) receiving function, a message sending/receiving function, etc. Accordingly, various types of UIs are required to effectively display and control various data corresponding to such functions in a portable terminal.

Also, in order for a UI to include various types of display screens and various manners for controlling the display screens, a size of the UI necessarily increases. Accordingly, it becomes difficult to effectively display the UI to a user when a size of the display screen is changed.

Meanwhile, Korean Patent Application No. KR 2008-0035709, for example, refers to a technology for displaying an image in a mobile phone having a multi-panel stack. In such a multi-panel stack type mobile phone having a three-stage zigzag body, when the multi-panel stack type mobile phone is closed, in a display window area, only an area coupled to an upper panel is activated to display an image. However, in the above-described technology, the phone must sense which area of a screen area is exposed, and a differentiated UI may not be effectively provided based on a size of the exposed screen area.

SUMMARY OF THE INVENTION

An object of the present invention is to address at least the problems and/or disadvantages and to provide at least the advantages described below. An aspect of the present invention provides a flexible display apparatus capable of distinctively providing a User Interface (UI) according to a folding extent of the flexible display apparatus, and a method of displaying the UI using the flexible display apparatus.

Another aspect of the present invention also provides a flexible display apparatus capable of displaying a UI by stages according to a folding extent of the flexible display apparatus, and a method of displaying the UI.

Another aspect of the present invention also provides a flexible display apparatus capable of successively changing a UI according to a folding extent of the flexible display apparatus, and a method of displaying the UI.

According to an aspect of the present invention, a flexible display apparatus is provided. The flexible display apparatus includes an exposed area determining unit for determining an exposed screen area facing outwards with respect to the flexible display apparatus; a User Interface (UI) generating unit for generating a UI corresponding to the outwardly facing exposed screen area; and a display unit for displaying the generated UI on the outwardly facing exposed screen area.

According to another aspect of the present invention, a method of displaying a User Interface (UI) using a flexible display apparatus is provided. The method includes determining an exposed screen area facing outwards with respect to the flexible display apparatus; and displaying a UI corresponding to the outwardly facing exposed screen area on the exposed screen area.

According to another aspect of the present invention, a computer readable recording medium having embodied thereon a computer program for executing a method for displaying a User Interface (UI) using a flexible display apparatus is provided. The method includes determining an exposed screen area facing outwards with respect to the flexible display apparatus; and displaying a UI corresponding to the outwardly facing exposed screen area on the exposed screen area.

BRIEF DESCRIPTION OF THE DRAWINGS

The above and other features and advantages of certain embodiments of the present invention will become more apparent from the following detailed description taken in conjunction with the accompanying drawings in which.

DETAILED DESCRIPTION OF EMBODIMENTS OF THE INVENTION

Hereinafter, embodiments of the present invention are described with reference to the accompanying drawings. In the following description, the same elements will be designated by the same reference numerals although they are shown in different drawings. Further, in the following description of the present invention, a detailed description of known functions and configurations incorporated herein may be omitted for the sake of clarity and conciseness.

In the drawings, lengths and sizes of layers and regions may be exaggerated for clarity.

It will be understood that when an element or layer is referred to as being "on" another element or layer, the element or layer can be positioned directly on another element or indirectly over another layer with intervening elements or layers. Like reference numbers refer to like elements throughout. Expressions such as "at least one of," when preceding a list of elements, modify the entire list of elements and do not modify the individual elements of the list.

Also, in the following description, a flexible display apparatus is a flexible display apparatus for displaying a User Interface (UI) on a screen by using a twistable and bendable display substrate, for example, a foldable, bendable, and rollable display substrate.

In addition, in the following description, folding a display substrate refers to changing a shape of the display substrate. For example, folding the display substrate may refer to bending and/or rolling the display substrate.

Figure 1:
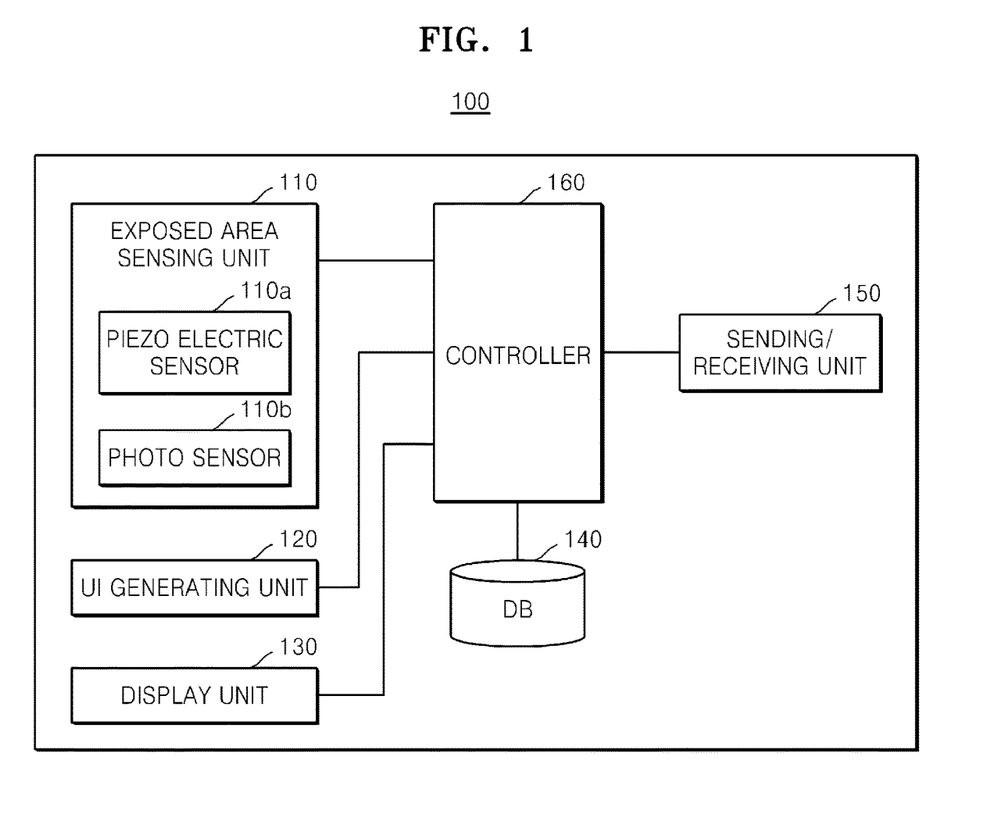
FIG. 1 is a block diagram of a flexible display apparatus, according to an embodiment of the present invention.

FIG. 1 is a block diagram illustrating a flexible display apparatus, according to an embodiment of the present invention.

Referring to FIG. 1, a flexible display apparatus 100 according to an embodiment of the present invention includes an exposed area sensing unit 110, a UI generating unit 120, a display unit 130, a DataBase (DB) 140, a sending/receiving unit 150, and a controller 160.

The exposed area sensing unit 110 senses an exposed screen area in the flexible display apparatus 100. When a display substrate (not shown) is asymmetrically folded, the exposed area sensing unit 100 may sense a screen area in the display substrate (not shown) that is exposed to the outside (i.e., an outwardly facing portion of the display area.

In this regard, the display substrate that is asymmetrically folded may represent a case where, when the display substrate is folded, boundaries of the display substrate do not correspond to each other, and thus a screen area exposed to the outside exists. Examples of such asymmetrically folded displays are shown and described with reference to FIGS. 2-11.

For example, a piezoelectric sensor 110a or a photo sensor 110b may be disposed in an edge of the display substrate (not shown), and the exposed area sensing unit 110 may sense a screen area exposed to the outside by determining whether the flexible display apparatus 100 is asymmetrically folded by using the piezoelectric sensor or the photo sensor.

Also, an extent to which the display substrate is folded may successively vary in the flexible display apparatus 100, and in this case, the exposed area sensing unit 110 may successively sense the varying exposed screen area.

The UI generating unit 120 generates a UI corresponding to the exposed screen area. For example, the UI generating unit 120 may generate a UI to be displayed on the exposed screen area based on a size of the exposed screen area.

The UI generating unit 120 may change at least one of a type and a number of objects included in the UI according to the size of the exposed screen area. The objects are components included in the UI, and the objects may include, for example, an image, a text, a movie, a font, an icon, a list of contents, etc.

In addition, the UI generating unit 120 may, when the size of the exposed screen area is less than or equal to a predetermined value, generate a UI by removing some of the objects included in the UI. For example, when the size of the exposed screen area is less than or equal to 70% of the entire screen area, the UI generating unit 120 may remove one or more of objects such as an image, a text, an icon, and/or a list of contents included in the UI. In addition to, or as an alternative to removing the objects, the UI generating unit 120 may change the font of text included in the UI.

The UI generating unit 120 may, when the size of the exposed screen area is less than or equal to the predetermined value, generate a UI by enlarging some of the objects included in the UI. For example, when a plurality of thumbnail images are included in a UI screen, if the size of the exposed screen area is changed into a size less than or equal to 70% of the entire screen area, the UI generating unit 120 may select, enlarge, and display a predetermined image.

In addition, the UI generating unit 120 may add a tool for controlling a screen to the UI, according to the size of the exposed screen area. When the size of the exposed screen area is less than or equal to a predetermined value, the UI generating unit 120 may display, for example, a scroll bar, an enlargement icon, and/or a reduction icon for controlling the screen on the UI.

The UI generating unit 120 may also generate the UI by stages according to the size of the exposed screen area. In generating the UI by stages, the UI generating unit 120 may divide the exposed screen area into a plurality of parts and generate a UI according to a size of each divided part of the exposed screen area.

For example, when the exposed screen area occupies the size in a range from about 70% to about 100% of the entire screen area, the UI generating unit 120 may generate a first UI including all components. When the exposed screen area occupies the size in a range from about 40% to about 70% of the entire screen area, the UI generating unit 120 may generate a second UI in which some objects are removed from the first UI. Also, when the exposed screen area occupies the size in a range from about 20% to about 40% of the entire screen area, the UI generating unit 120 may generate a third UI in which some objects are removed from the second UI.

The UI generating unit 120 may generate a UI in advance according to the exposed screen area. When the exposed screen area of the flexible display apparatus 100 is changed, the previously-generated UI may be displayed on the screen.

Although, in the above examples, the UI generating unit 120 generates a UI corresponding to the size of the exposed screen area, embodiments of the present invention are not limited thereto, and the UI generating unit 120 may request a server to provide the UI corresponding to the size of the exposed screen area and receive the UI differentiated according to the size of the exposed screen area from the server.

Examples of UI corresponding to the size of the exposed screen area according to embodiments of the present invention are described in further detail herein with reference to FIGS. 2 to 10.

The display unit 130 displays a UI corresponding to an exposed screen area within an exposed screen. The display unit 130 may, when a size of the exposed screen area changes, enlarge or reduce the UI according to the changed size of the exposed screen area. The display unit 130 may, when the exposed screen area is changed by more than a predetermined threshold value, display a UI that is different from the enlarged or reduced UI.

For example, when the exposed screen area has a size in a range from about 70% to about 100% of the entire screen area, the display unit 130 may enlarge and reduce the first UI. When the size of the exposed screen area is successively changed from a size within a range from about 70% to about 100% to a size within a range from about 40% to about 70%, the display unit 130 may display the second UI instead of the first UI.

When the size of the exposed screen area is in a predetermined range, the display unit 130 may remove the UI from the display. For example, when the exposed screen area occupies a size within a range from about 0% to about 20% of the entire screen area, the display unit 130 may determine that the exposed screen area is not valid and remove the UI from the exposed screen area.

The DB 140 stores various pieces of information required in order to display UIs that differ according to the exposed screen area. The DB 140 may distinctively store the UI corresponding to the size of the exposed screen area. The DB 140 may also store a setting value corresponding to objects to be included in the UI according to the exposed screen area. Such an object may include, for example, an image, a text, an icon, a font, a list of contents, etc. The setting value regarding the objects to be included in the UI may be used when the UI generating unit 120 generates the UI.

The sending/receiving unit 150 sends/receives various pieces of information required in order to display a UI that differs according to the exposed screen area to/from an external server. The sending/receiving unit 150 may send a signal requesting the server to provide the UI corresponding to the exposed screen area and may receive the UI from the server.

The controller 160 controls overall operations of the flexible display apparatus 100. The controller 160 controls the exposed area sensing unit 110, the UI generating unit 120, the display unit 130, the DB 140, and the sending/receiving unit 150 so that the flexible display apparatus 100 senses the exposed screen area and provides a UI that differs according to a size of the sensed exposed screen area.

Figure 2:
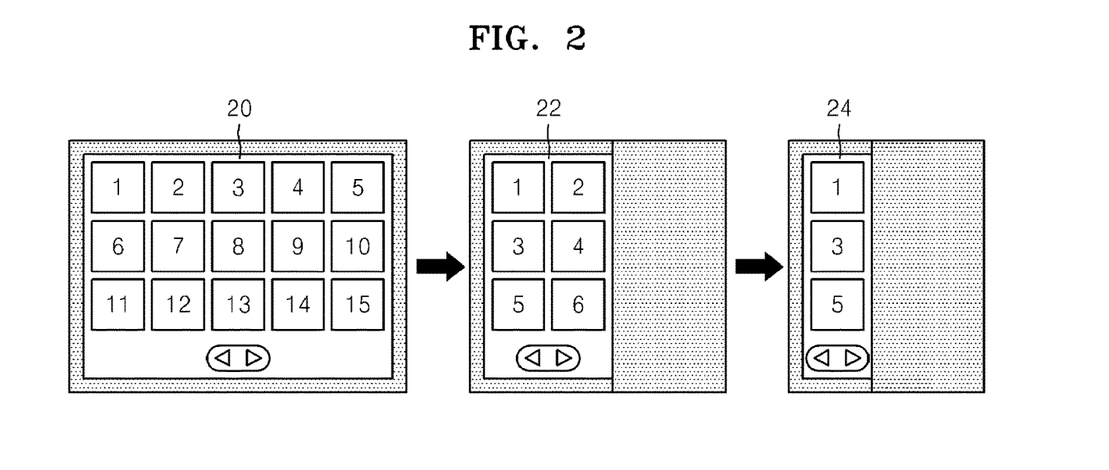
FIGS. 2 to 4 are diagrams illustrating examples in which a flexible display apparatus changes an object included in a User Interface (UI) according to a size of an exposed screen area and displays the object, according to an embodiment of the present invention.
Figure 3:
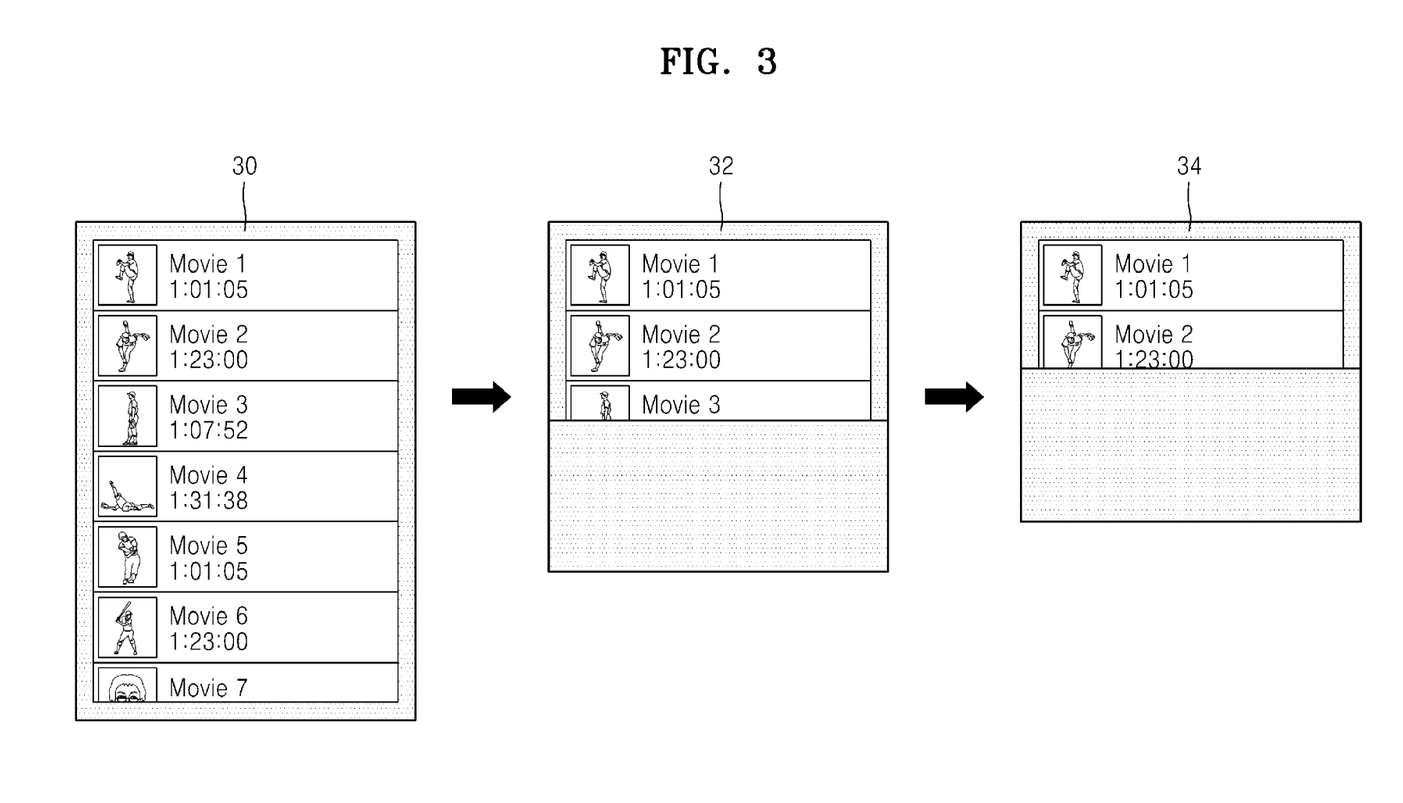
Figure 4:
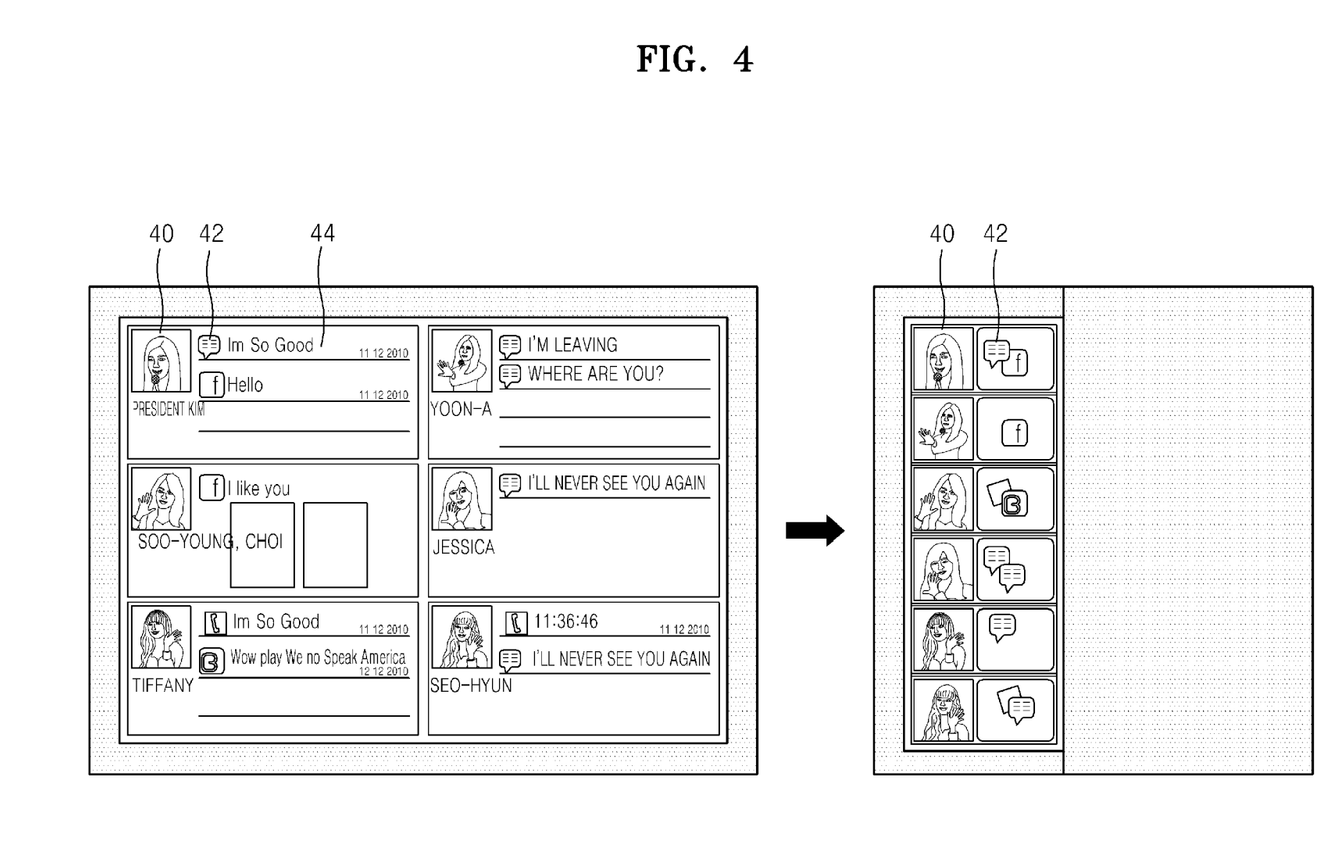

FIGS. 2 to 4 are diagrams illustrating examples in which the flexible display apparatus 100 changes an object included in a UI according to a size of an exposed screen area and displays the object according to embodiments of the present invention.

Referring to FIG. 2, a UI according to an embodiment of the present invention includes a plurality of thumbnail images, and the number of thumbnail images differs according to the size of the exposed screen area. When the flexible display apparatus 100 is not folded, a UI 20 includes fifteen thumbnail images, and when the flexible display apparatus 100 is folded, a UI 22 may include six thumbnail images and a UI 24 may include three thumbnail images, as shown in the leftmost, center, and rightmost examples, respectively, in FIG. 2. Information regarding a number of thumbnail images to be included in a UI and information regarding an arrangement of the thumbnail images is set in advance according to a size of the exposed screen area and is stored in the DB 140, and the UI generating unit 120 distinctively generates the UI according to the previously-set information.

Referring to FIG. 3, according to another embodiment of the present invention, a UI includes a list of contents, and the UI the list includes a different number of contents according to a size of an exposed screen area. When the flexible display apparatus 100 is not folded, a UI 30 the list includes seven content items, and when the flexible display apparatus 100 is folded, a UI 32 includes a list having three contents according to the size of the exposed screen area, and a UI 34 includes a list having two contents according to the size of the exposed screen area, as shown in the leftmost, center, and rightmost examples, respectively, in FIG. 3. Information regarding a number and an arrangement of lists of contents and components included within each list are set in advance according to the size of the exposed screen area and are stored in the DB 140, and the UI generating unit 120 distinctively generates the UI according to the previously stored information.

Referring to FIG. 4, according to further another embodiment of the present invention, the UI includes a user's image 40, an icon 42 representing a type of a posting uploaded by a user, and a comment 44, and a portion of the image 40, the icon 42, as shown in the leftmost image of FIG. 4. When the flexible display apparatus 100 is folded, the comment 44 may be excluded from the UI according to the size of the exposed screen area. More specifically, when the flexible display apparatus 100 is not folded, the UI includes all of the user's image 40, the icon 42, and the comment 44, and when the flexible display apparatus 100 is folded as shown in the rightmost image of FIG. 4, the UI includes summarized data including the user's image 40 and the icon 42.

Information regarding a number and an arrangement of objects to be included in the UI is set in advance according to the size of the exposed screen area and is stored in the DB 140/The UI generating unit 120 distinctively generates the UI according to the previously-set information.

Figure 5:
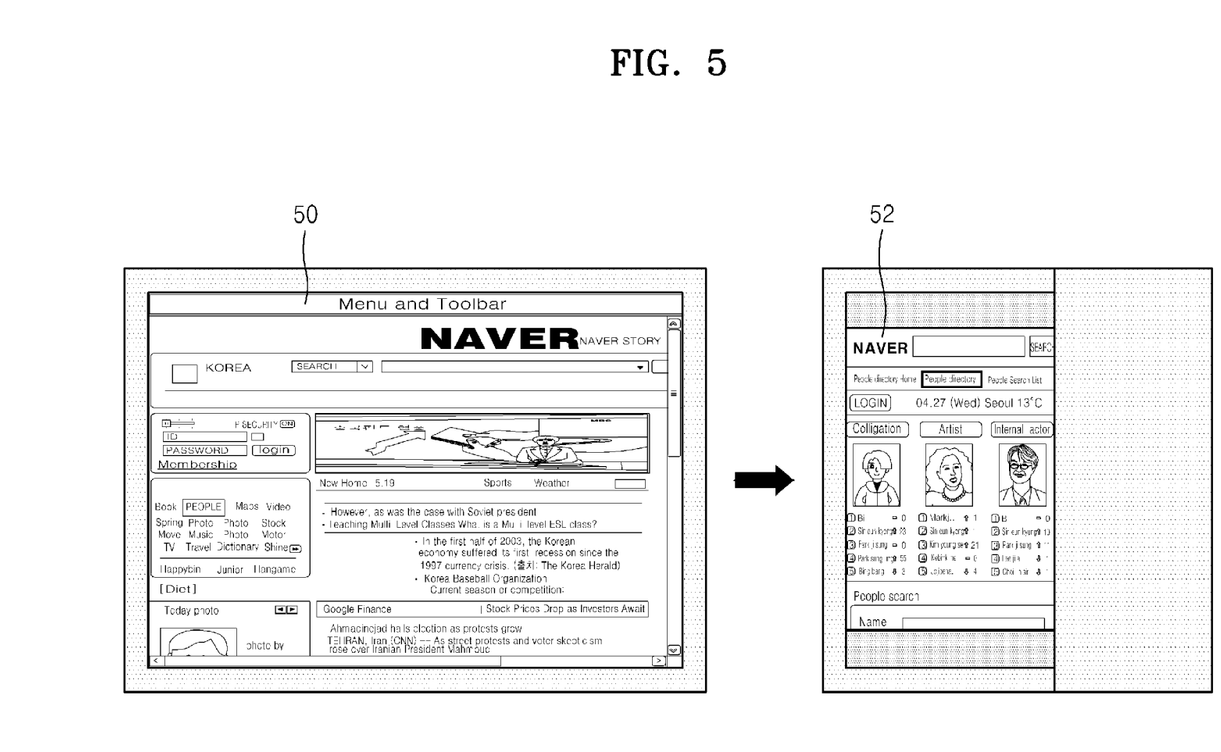
FIG. 5 is a diagram illustrating an example in which a flexible display apparatus receives UIs that differ according to a size of an exposed screen area and displays the UIs, according to an embodiment of the present invention.

FIG. 5 is a diagram illustrating an example in which the flexible display apparatus 100 receives UIs that differ according to a size of an exposed screen area and displays the UIs, according to an embodiment of the present invention.

Referring to FIG. 5, when the flexible display apparatus 100 is not folded, the flexible display apparatus 100 receives an Internet navigator 50 for a Personal Computer (PC) from a server and display the Internet navigator 50 for the PC. When the flexible display apparatus 100 is folded, the flexible display apparatus 100 receives an Internet navigator 52 for a mobile device from the server and display the Internet navigator 52 for the mobile device. The server may generate a UI according to the exposed screen area in advance and/or provide a UI generated in response to a request from the flexible display apparatus 100.

Figure 6:
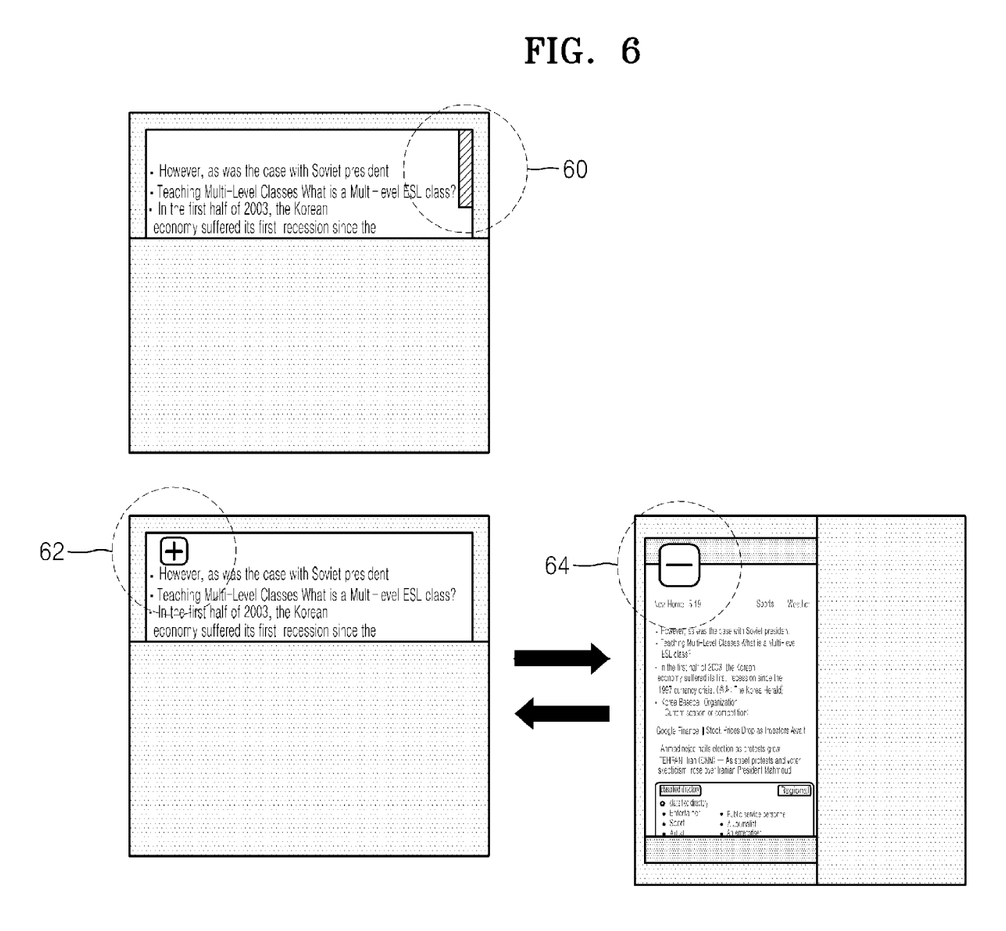
FIG. 6 is a diagram illustrating an example in which a flexible display apparatus adds a tool for controlling a screen to a UI according to a size of an exposed screen area and displays the tool, according to an embodiment of the present invention.

FIG. 6 is a diagram illustrating an example in which the flexible display apparatus 100 adds a tool for controlling a screen to a UI according to a size of an exposed screen area and displays the tool, according to an embodiment of the present invention.

Referring to FIG. 6, when the flexible display apparatus 100 is folded, the flexible display apparatus 100 may add a scroll bar 60, a '+' icon 62, and a '−' icon 64 to the UI. A user may move the screen by using the scroll bar 60 included in the UI. The user may display a reduced version of an entire screen by using the '+' icon 62 included in the UI and may display an enlarged partial screen by using the '−' icon 64 included in the UI. Information regarding a type of the tool for controlling the screen to be included in the UI and information regarding a position of the tool to be displayed is set in advance according to the size of the exposed screen area and is stored in the DB 140, and the UI generating unit 120 distinctively generates the UI according to the previously-set information.

Figure 7:
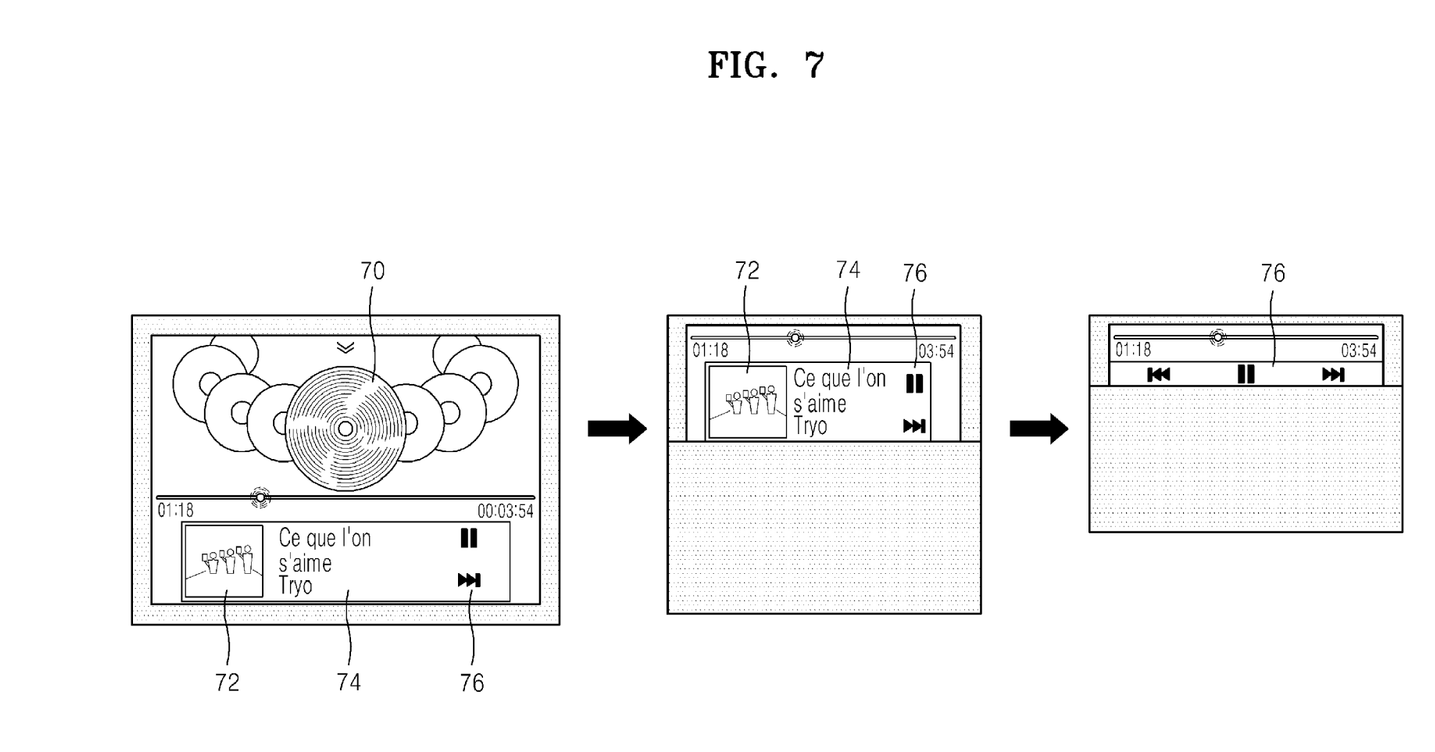
FIGS. 7 and 8 are diagrams illustrating examples in which a flexible display apparatus displays a UI by stages according to a size of an exposed screen area, according to an embodiment of the present invention.
Figure 8:
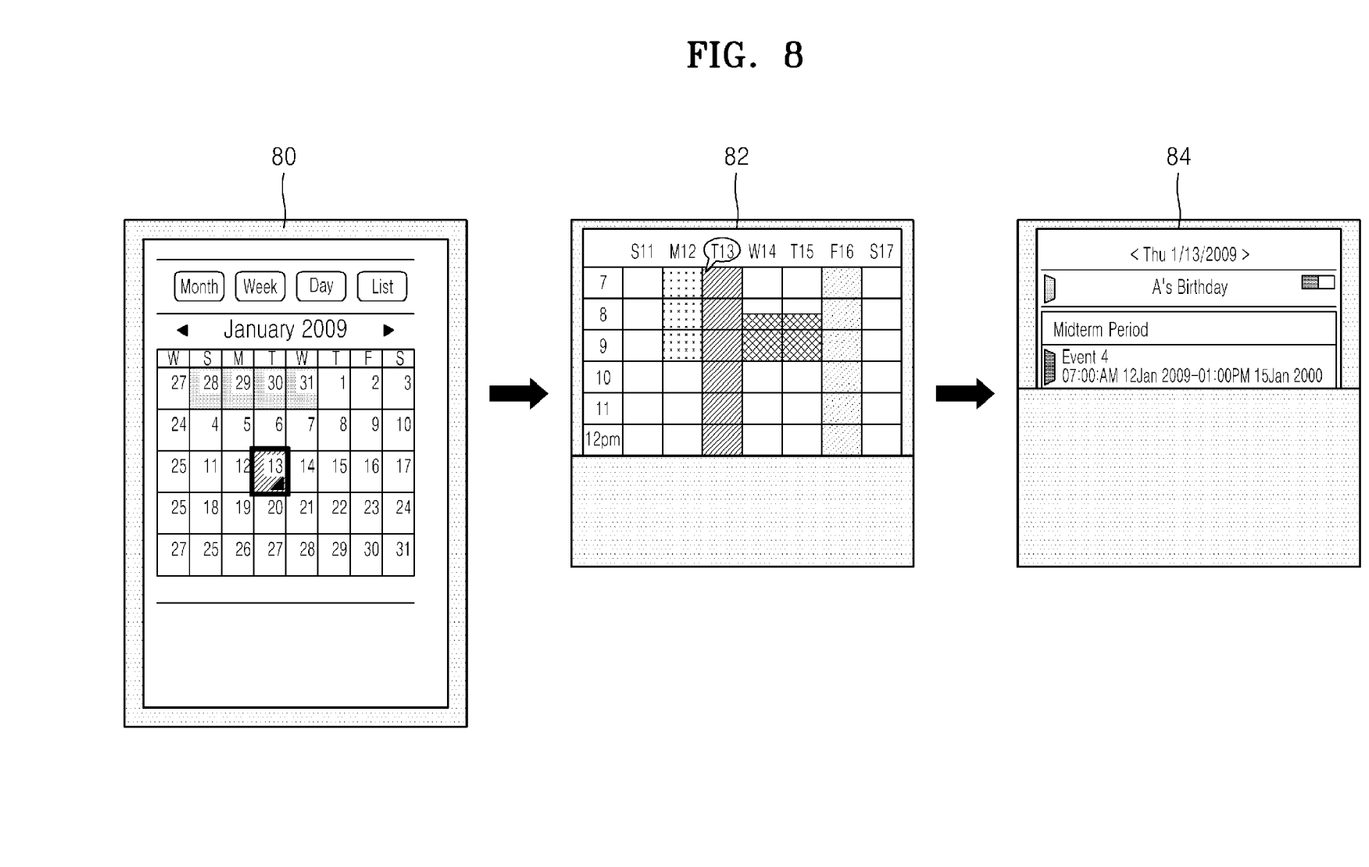

FIGS. 7 and 8 are diagrams examples in which the flexible display apparatus 100 displays a UI by stages according to a size of an exposed screen area, according to an embodiment of the present invention.

Referring to FIG. 7, a UI for reproducing music includes an album list image 70, an album jacket image 72, a title 74, and a control image 76. When the flexible display apparatus 100 is not folded, the UI may include the entire album list image 70, the album jacket image 72, the title 74, and the control image 76. Also, when the flexible display apparatus 100 is folded, and when the size of the exposed screen area is less than a first threshold value and greater than a second threshold value, the UI includes the album jacket image 72, the title 74, and the control image 76, as shown in the leftmost image of FIG. 7. When the flexible display apparatus 100 is folded and when the size of the exposed screen area is less than the second threshold value, the UI includes only the control image 76, as shown in the center image of FIG. 7. When the size of the exposed screen area is successively changed within a range less than the first threshold value or greater than the second threshold value, the UI including the album jacket image 72, the title 74, and the control image 76 is enlarged or reduced accordingly, such as shown in the rightmost image of FIG. 7.

Referring to FIG. 8, a UI for scheduling includes a list of schedules that differs according to the exposed screen area. When the flexible display apparatus 100 is not folded, the UI includes a monthly schedule list 80. When the flexible display apparatus 100 is folded, and when the size of the exposed screen area is less than the first threshold value and greater than the second threshold value, the UI includes a weekly schedule list 82. When the flexible display apparatus 100 is folded and when the size of the exposed screen area is less than the second threshold value, the UI includes a daily schedule list 84.

When the size of the exposed screen area is successively changed within a range less than the first threshold value or greater than the second threshold value, the UI including the weekly schedule list 82 may be enlarged or reduced.

Figure 9:
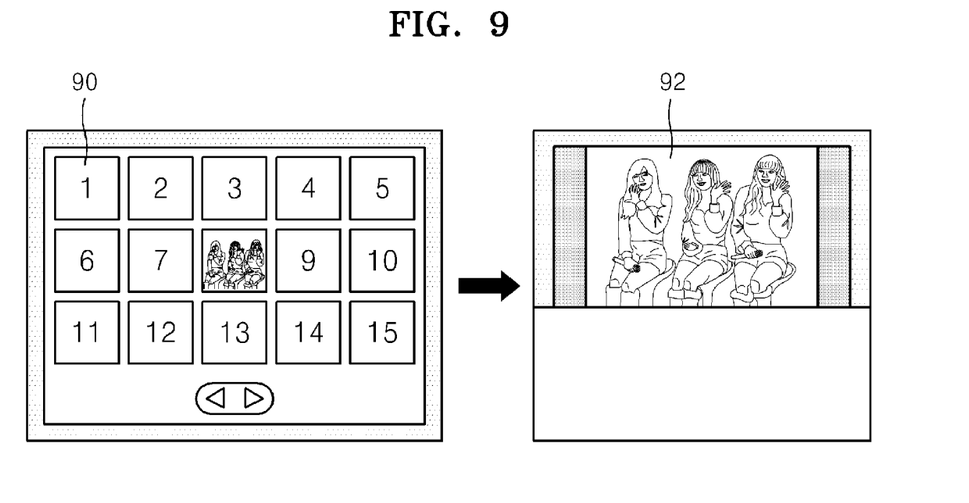
FIGS. 9 and 10 are diagrams illustrating an example in which a flexible display apparatus enlarges specific contents in a UI according to a size of an exposed screen area and displays the specific contents, according to an embodiment of the present invention.
Figure 10:
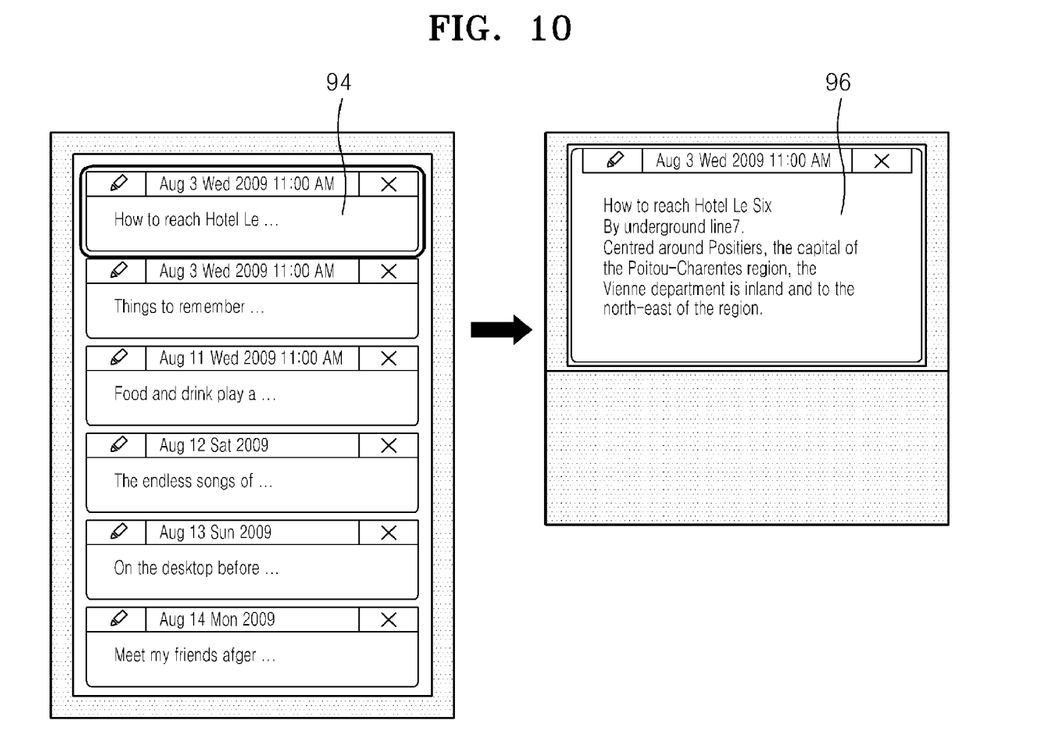

FIGS. 9 and 10 are diagrams illustrating an example in which the flexible display apparatus 100 enlarges specific contents in a UI according to a size of an exposed screen area and displays the specific contents, according to an embodiment of the present invention.

Referring to FIG. 9, when the flexible display apparatus 100 is not folded, the UI includes a plurality of thumbnail images 90. When the flexible display apparatus 100 is folded, the UI includes a single enlarged image 92.

Referring to FIG. 10, when the flexible display apparatus 100 is not folded, the UI includes a plurality of summarized comments 94. When the flexible display apparatus 100 is folded, the UI includes a single detailed comment 96.

Figure 11:
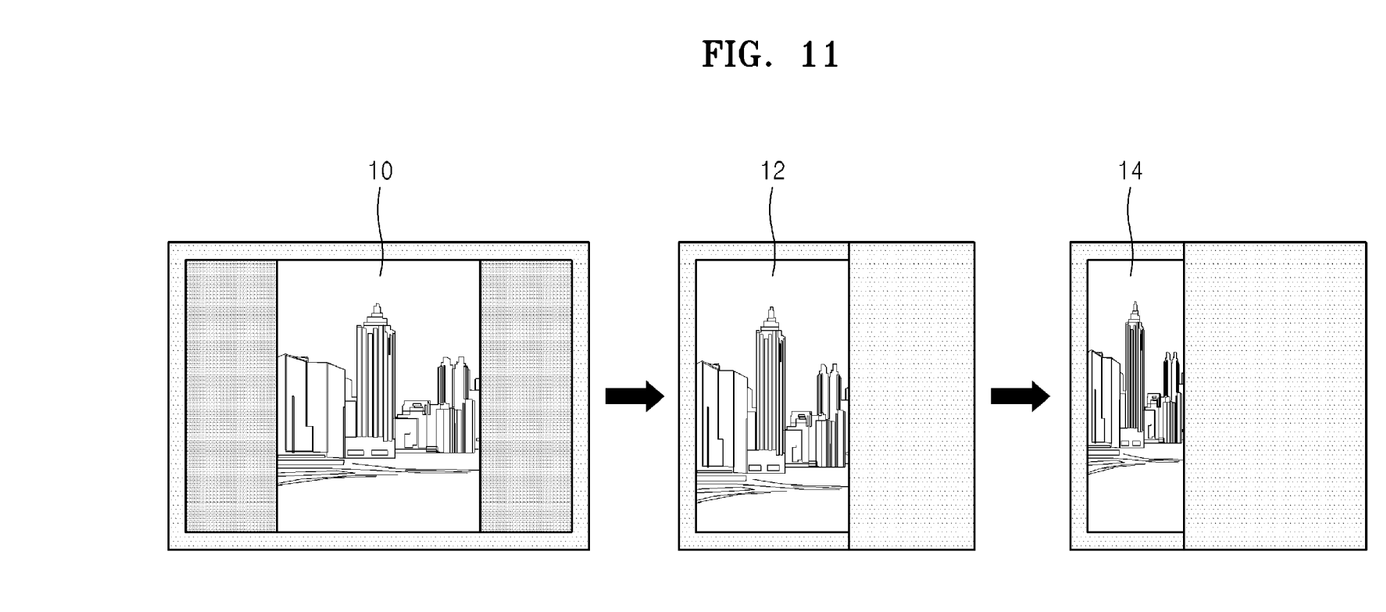
FIG. 11 is a diagram illustrating an example in which a flexible display apparatus enlarges or reduces a UI when a size of an exposed screen area is successively changed, according to an embodiment of the present invention.

FIG. 11 is a diagram illustrating an example in which the flexible display apparatus 100 enlarges or reduces a UI when a size of an exposed screen area is successively changed, according to an embodiment of the present invention.

Referring to FIG. 11, when the exposed screen area of the flexible display apparatus 100 is successively changed, the flexible display apparatus 100 successively senses the size of the exposed screen area and enlarges or reduces UIs 10, 12, and 14 according to the size of the exposed screen area.

Figure 12:
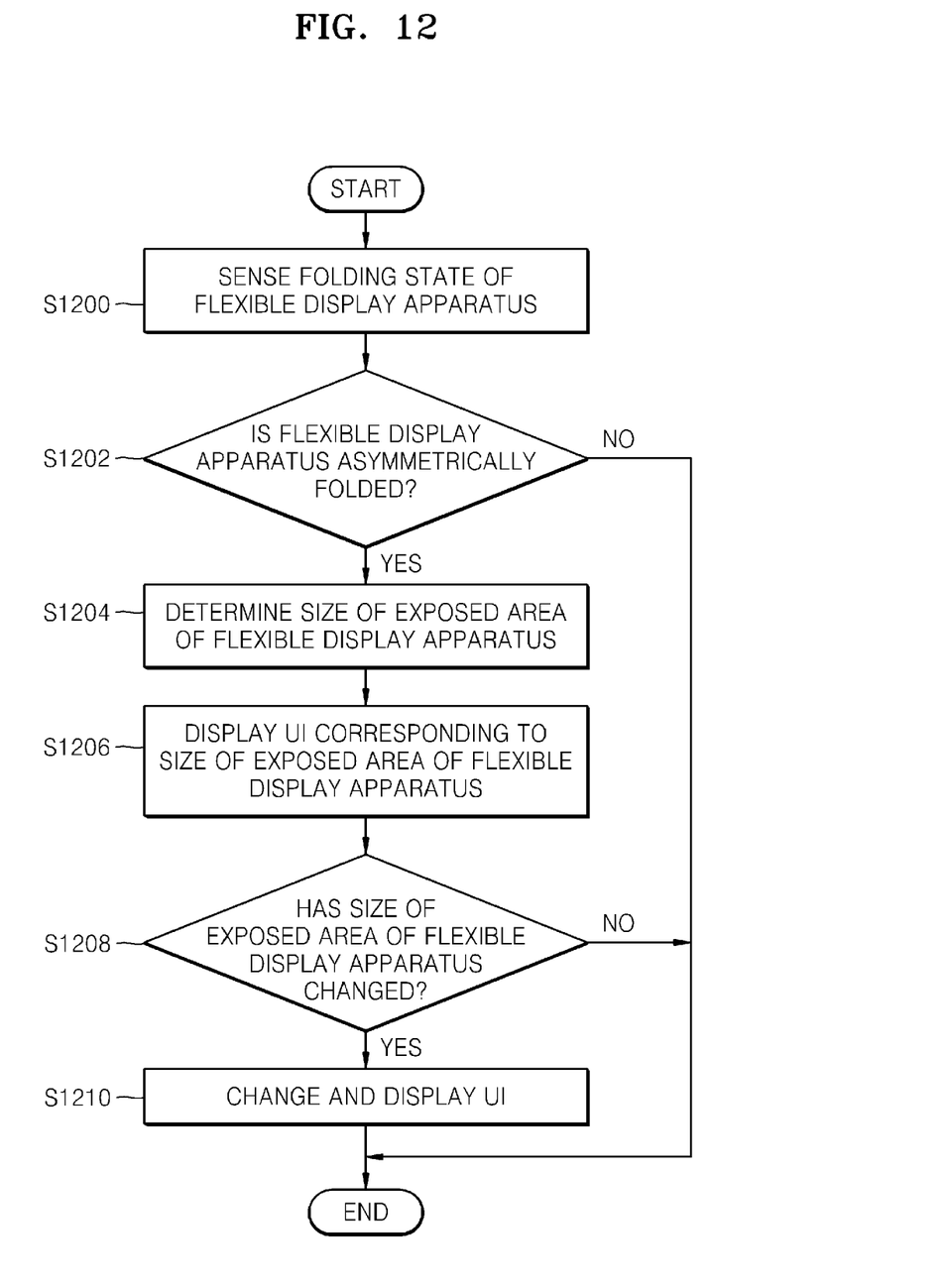
FIG. 12 is a flowchart illustrating a method of displaying a UI by using a flexible display apparatus according to an exposed screen area, according to an embodiment of the present invention.

FIG. 12 is a flowchart illustrating a method of displaying a UI by using the flexible display apparatus 100 according to an exposed screen area, according to an embodiment of the present invention.

Referring to FIG. 12, in step S1200, a folding state of the flexible display apparatus 100 is sensed. In step S1200, the flexible display apparatus 100 determines whether a display screen is folded by using a piezoelectric sensor or a photo sensor.

In step S1202, the flexible display apparatus 100 determines whether the flexible display apparatus 100 is asymmetrically folded. In this regard, the flexible display apparatus 100 that is asymmetrically folded may represent a case where, since boundaries of the display substrate do not correspond to each other, a screen area exposed to an exterior of the flexible display apparatus 100 exists. As a result of the determination, when the flexible display apparatus 100 is asymmetrically folded, a size of an exposed area of the flexible display apparatus 100 is determined in step S1204.

In step S1206, a UI corresponding to the size of the exposed area of the flexible display apparatus 100 is displayed.

In step S1206, the flexible display apparatus 100 may change at least one of a type and a number of objects included in the UI according to the size of the exposed screen area. The objects are components included in the UI and may include, for example, an image, a text, a font, an icon, and a list of contents.

In step S1206, the flexible display apparatus 100 may remove, when the size of the exposed screen area is less than or equal to a predetermined value, some of the objects included in the UI and display the modified UI. The flexible display apparatus 100 may remove, when the size of the exposed screen area is equal to or less than 70% of the entire screen area, one or more objects, such as an image, text, an icon, and/or a list of contents and/or change the font of the text included in the UI.

In step S1206, the flexible display apparatus 100 may enlarge, when the size of the exposed screen area is less than or equal to the predetermined value, some of the objects included in the UI and generate a modified UI.

When the UI includes a plurality of thumbnail images, if the size of the exposed screen area is changed into a size less than or equal to 70% of the entire screen area, the flexible display apparatus 100 may select and enlarge a predetermined image and displays the predetermined image on the screen.

In step S1206, the flexible display apparatus 100 may add a tool for controlling a screen to the UI according to the size of the exposed screen area. When the size of the exposed screen area is less than or equal to a predetermined value, the flexible display apparatus 100 may display, for example, a scroll bar, an enlargement icon, and/or a reduction icon for controlling the screen on the UI.

In step S1206, the flexible display apparatus 100 may also display the UI in stages according to the size of the exposed screen area. The UI generating unit 120 may divide the exposed screen area into a plurality of parts and display a UI that differs according to a size of each divided part of the exposed screen area.

For example, when the exposed screen area has a size within a range from about 70% to about 100% of the entire screen area, the flexible display apparatus 100 may display a first UI including all components. When the exposed screen area has a size in a range from about 40% to about 70% of the entire screen area, the flexible display apparatus 100 may display a second UI in which some objects are removed from the first UI. When the exposed screen area has a size in a range from about 20% to about 40% of the entire screen area, the flexible display apparatus 100 may display a third UI in which some objects are removed from the second UI.

Although, in the above-described embodiments according to the present invention, the flexible display apparatus 100 generates a UI corresponding to the size of the exposed screen area, the present invention is not limited thereto, and the flexible display apparatus 100 may request a server to provide the UI corresponding to the size of the exposed screen area and receive the UI differentiated according to the size of the exposed screen area from the server in accordance with embodiments of the present invention.

In step S1208, the flexible display apparatus 100 determines whether the size of the exposed screen area is changed. When a folding state of the flexible display apparatus 100 is successively changed, the flexible display apparatus 100 successively senses the exposed screen area and successively determines whether the exposed screen area is changed.

In step S1210, a UI is changed and displayed. In step S1210, the flexible display apparatus 100 may enlarge or reduce the UI according to a size of the exposed screen area. The flexible display apparatus 100 may display a UI that differs according to the size of the exposed screen area.

Figure 13:
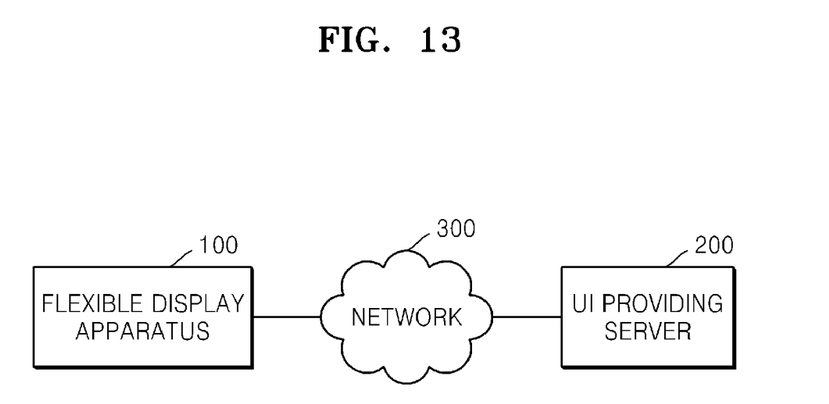
FIG. 13 is a block diagram illustrating a UI providing system that operates via a network, according to an embodiment of the present invention.

FIG. 13 is a block diagram illustrating a UI providing system that operates via a network, according to an embodiment of the present invention.

Referring to FIG. 13, the UI providing system that operates via a network includes the flexible display apparatus 100, a UI providing server 200, and a network 300. The flexible display apparatus 100, when a display screen is folded, determines a size of an exposed screen area and may request the UI providing server 200 to provide a UI corresponding to the determined exposed screen area.

In this case, the UI providing server 200 generates the UI corresponding to the exposed screen area similar to the above-described UI generating unit 120, and provides the requested UI to the flexible display apparatus 100 in response to the request from the flexible display apparatus 100. For example, the UI providing server 200 may provide the Internet navigator 50 for a PC or the Internet navigator 52, as shown in FIG. 5, for a mobile device to the flexible display apparatus 100 according to the size of the exposed screen area.

The UI providing server 200 may alternatively generate a UI in advance according to the exposed screen area and provide the previously-generated UI in response to the request from the flexible display apparatus 100.

According to embodiments of the present invention, a flexible display apparatus may distinctively provide a UI according to a folding extent of the flexible display apparatus.

The flexible display apparatus may also display a UI in stages according to a folding extent of the flexible display apparatus.

In addition, the flexible display apparatus may successively change a UI according to a folding extent of the flexible display apparatus.

Embodiments of the preset invention may be embodied in the form of a computer-executable recording medium including a command such as a computer-executable program module. A computer-readable medium may be an arbitrary medium that may be accessed by a computer, and includes volatile and nonvolatile mediums and separable and non-separable mediums. The computer-readable medium may also include a computer recording medium and a communication medium. Such a computer recording medium may include volatile and/or nonvolatile mediums and separable and non-separable mediums that are embodied by using an arbitrary method or technology for storing information such as a computer-readable command, a data structure, a program module, or other data. The communication medium may include any of a computer-readable command, a data structure, a program module, other data of a data signal modulated, such as a carrier wave, or other transmission mechanisms, and the communication medium includes an arbitrary information transmission medium.

While the present invention has been particularly shown and described with reference to certain embodiments thereof, it will be understood by one of ordinary skill in the art that various changes in form and details may be made therein without departing from the spirit and scope of the present invention as defined by the following claims. The described embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An electronic device comprising:
   a flexible display;
   a sensor for detecting whether the electronic device is folded; and
   a processor configured to:
      control the flexible display to provide a first user interface (UI) while the flexible display is unfolded,
      based on the flexible display being folded asymmetrically by a single fold, identify a size of an exposed area among the flexible display,
      based on the size of the exposed area being greater than or equal to a threshold value, control the flexible display to provide a second UI related to the first UI on the exposed area based on the size of the exposed area, and
      based on the size of the exposed area being less than a threshold value control the flexible display not to provide any UI on the exposed area.

2. The electronic device as claimed in claim 1, wherein a UI element included in the first UI comprises a UI element included in the second UI and an additional UI element.

3. The electronic device as claimed in claim 1, wherein a size of a UI element included in the first UI is greater than a size of a UI element included in the second UI.

4. The electronic device as claimed in claim 1, further comprising:
   a transceiver configured to communicate with an external server,
   wherein the processor controls the transceiver to receive, from the external server, the first UI while the electronic device is unfolded, and when the electronic device is folded, controls the transceiver to receive, from the external server, the second UI.

5. The electronic device as claimed in claim 1, further comprising:
   a storage configured to store the first UI and the second UI,
   wherein the processor controls the electronic device to provide the first UI stored in the storage while the electronic device is unfolded, and when the electronic device is folded, controls the electronic device to provide the second UI stored in the storage.

6. A controlling method of an electronic device which comprises a flexible display, the method comprising:
providing a first user interface (UI) while the flexible display is unfolded;
based on the flexible display being folded asymmetrically by a single fold, identifying that a size of an exposed area among the flexible display is less than a threshold value; and
based on the size of the exposed area being less than the threshold value, not providing any UI on the exposed area.

7. The method of claim 6, wherein a UI element included in the first UI comprises a UI element included in a second UI, which is otherwise provided on the exposed area if the size of the exposed area is determined to be greater than or equal to the threshold value, and an additional UI element.

8. The method of claim 6, wherein a size of a UI element included in the first UI is greater than a size of a UI element included in a second UI, which is otherwise provided on the exposed area if the size of the exposed area is determined to be greater than or equal to the threshold value.

9. The method of claim 6, wherein the first UI is received from an external server while the electronic device is unfolded, and when the electronic device is folded, a second UI, which is otherwise provided on the exposed area if the size of the exposed area is determined to be greater than or equal to the threshold value, is received from the external server.

10. The method of claim 6, wherein the first UI and a second UI, which is otherwise provided on the exposed area if the size of the exposed area is determined to be greater than or equal to the threshold value, are prestored, and
wherein the electronic device provides the prestored first UI while the electronic device is unfolded, and when the electronic device is folded such that the size of the exposed area is greater than or equal to the threshold value, provides the prestored second UI.

* * * * *